April 18, 1939.  N. S. STERN  2,154,586
SHOCK ABSORBING DEVICE
Filed Aug. 29, 1938  4 Sheets-Sheet 1
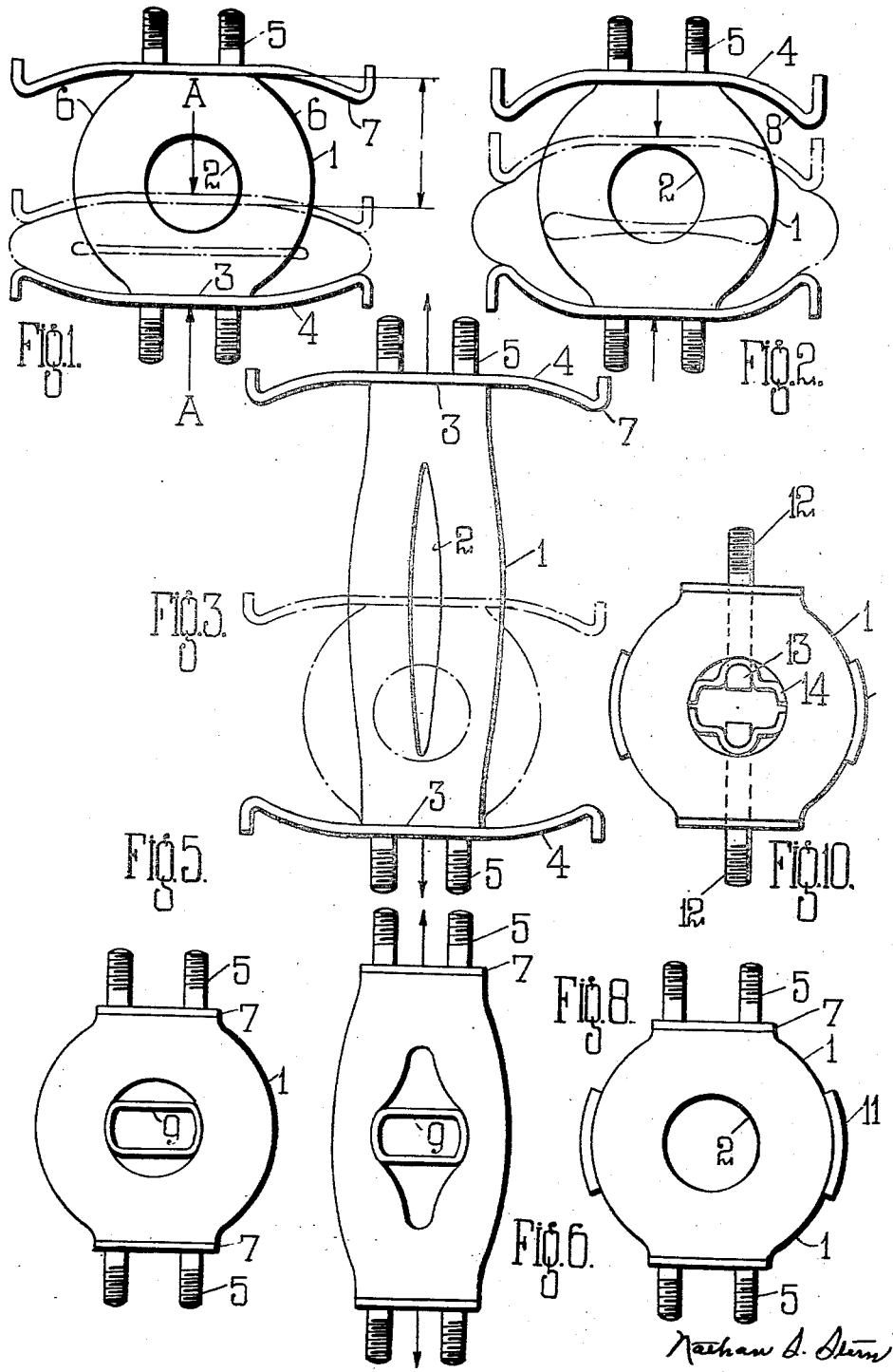

April 18, 1939.  N. S. STERN  2,154,586
SHOCK ABSORBING DEVICE
Filed Aug. 29, 1938  4 Sheets-Sheet 2

Nathan S. Stern
By Mason & Porter
Attorneys

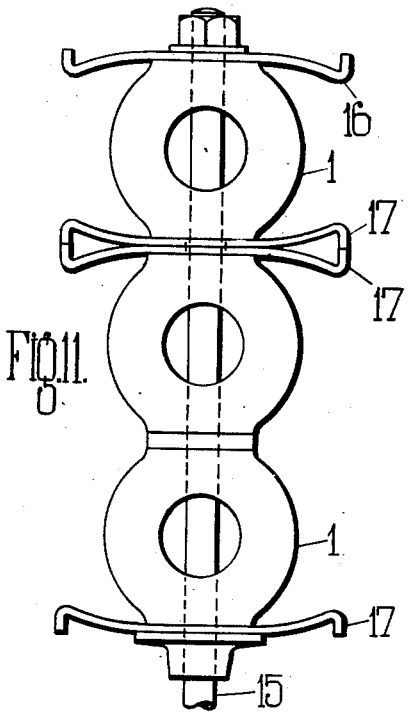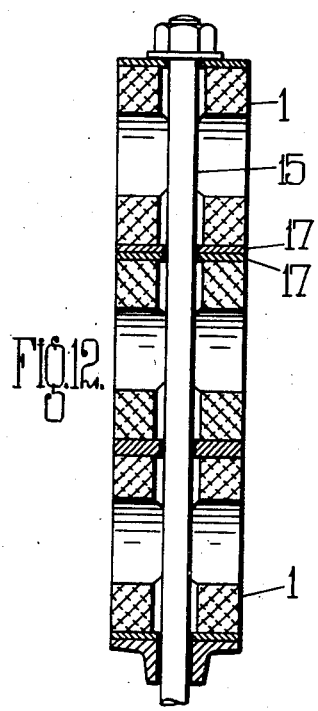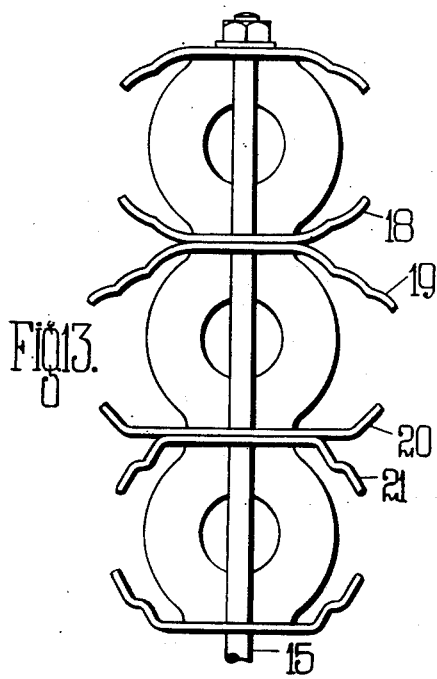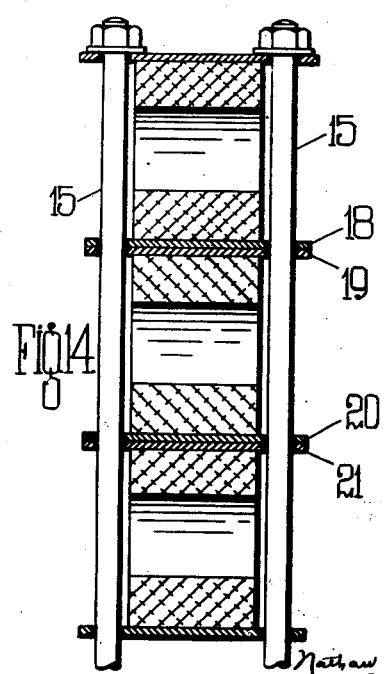

April 18, 1939.   N. S. STERN   2,154,586
SHOCK ABSORBING DEVICE
Filed Aug. 29, 1938   4 Sheets-Sheet 4
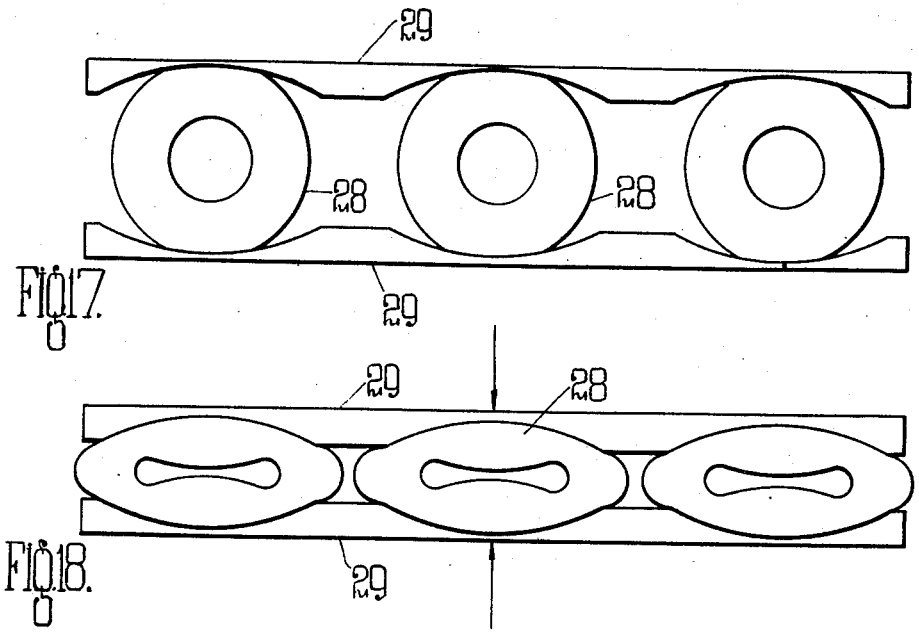
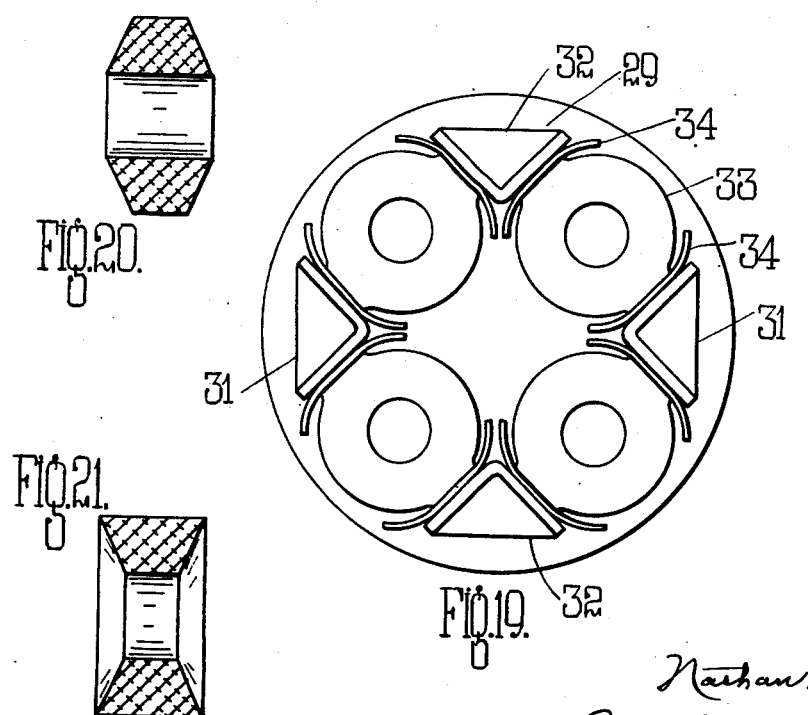

Patented Apr. 18, 1939

2,154,586

UNITED STATES PATENT OFFICE 2,154,586

SHOCK ABSORBING DEVICE

Nathan Solly Stern, Leicester, England

Application August 29, 1938, Serial No. 227,415
In Great Britain July 31, 1937

3 Claims. (Cl. 267—63)

The present invention relates to shock absorbing devices using rubber or the like elastic blocks which when compressed or extended do not follow Hooke's law.

Various forms of solid and hollow rubber blocks have been used for absorbing shock or vibration and in certain cases the stress-strain curve of these has been modified by an increasing area of the block contacting with rigid fixed surfaces with increasing stress on the block.

An object of the present invention is to provide a shock-absorber device which will retain its stability in use and be equally capable of absorbing tensional as well as compressional stresses.

According to the present invention a rubber block united by adhesion, e. g. vulcanising or cementing on two opposite sides to rigid elements to damp the relative displacement of these by tensional or compressional stress set up in the rubber block is perforated at right angles to the line of application of stress to leave a free open space therethrough, rigid plates being provided contacting with a progressively increasing area of the rubber block with increase of stress upon it.

The invention is more particularly described with reference to the accompanying drawings, in which:

Figure 1 is a side elevation of one simple form of construction.

Figure 2 is a view of a slightly modified form of construction.

Figure 3 is an arrangement similar to that shown in Figure 1, but in which the stress is reversed; that is to say, the block is in tension instead of being in compression.

Figure 5 is a modified form of construction.

Figure 6 shows the arrangement of Figure 5 in tension.

Figure 8 is a further modified form of construction.

Figure 10 is a still further modified form of construction.

Figure 11 is a side elevation of an arrangement in which a number of rubber blocks are disposed in series.

Figure 12 is a corresponding sectional side elevation.

Figure 13 shows a modification of the construction shown in Figure 11.

Figure 14 is a corresponding side sectional elevation.

Figure 17 is a modified arrangement showing a number of rubber blocks disposed to take loads in compression.

Figure 18 is a view similar to Figure 17 showing the blocks under compression.

Figure 19 shows the application of the invention in one form of a torsion coupling.

Figure 20 shows a modified form of end sectional elevation through the block.

Figure 21 shows another form of section for the block.

Figure 4:
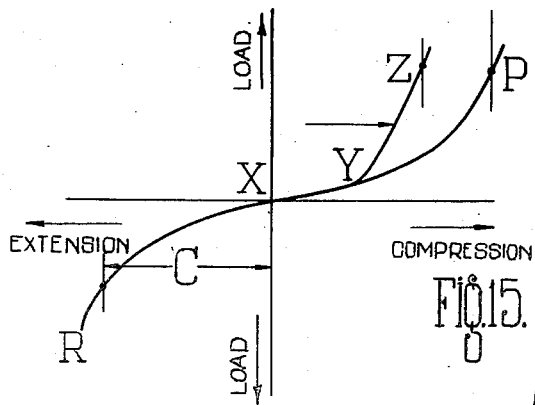
Figure 4 is the stress-strain curve of the construction shown in Figures 1 to 3.

A rubber block 1, Figures 1 to 10, is in its simplest form shaped as a portion of a hollow cylinder having flat side surfaces parallel to the plane of the paper, a central aperture 2 and flats 3 on opposite sides forming convenient surfaces for attachment by vulcanisation to metal plates 4, which may be formed with attachment bolts 5.

The plates 4 are so shaped that when the block of Figure 1 is subject to a compression load applied in the direction of the arrows A. A. the block is deformed as shown in dotted lines, and it will be seen that the outer surface 6 of the block progressively is engaged by the inner surfaces 7 of the plates 4, so that the distortion of the rubber block, is progressively arrested; that is to say, that a limit is set by the plates 7 to the distortion of the rubber block 1 and this free distortion is progressively restricted as an increasing area of the surface of the block contacts with the plates 7 with increasing stress.

Figure 7:
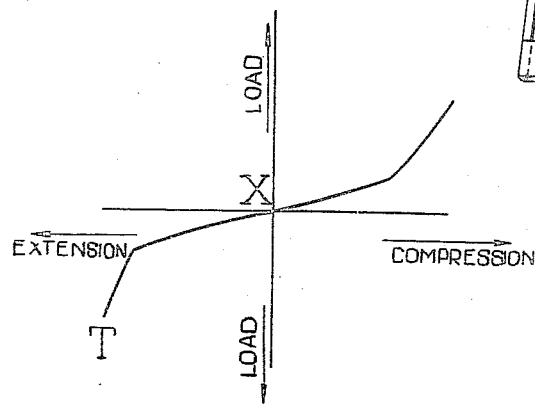
Figure 7 is the stress-strain curve of the construction of Figure 5 in tension.

Figure 2 shows that by modifying the outline of the plates 4 as shown at 8, the restriction of free distortion need not be applied throughout the total area of the rubber block 1 subject to distortion, but only over a predetermined part of this. In other words, as the block is subjected to increasing load, its distortion is progressively restricted with further loading from the point X, Figure 4, to the point Y, and then at a different rate to the point Z, whereas under natural conditions as with the block of Figure 1, as shown on the curve X. Y. P. the deflection or distortion is progressively restricted throughout the range of loading.

Where the loading is in the form of a tension as shown in Figure 3, in which the rubber block normally of the shape shown in dotted lines when unstressed is distorted by tension to the position shown in full lines, then the stress-strain curve will be as shown at X. R. Figure 4, but if this is controlled as for instance, by inserting within the hollow part 2 of the block a member, such as 9, Figure 5 then the stress-strain curve on application of tension load distorting the block as shown in Figure 6, will be as shown at X. T. (Figure 7).

Figure 9:
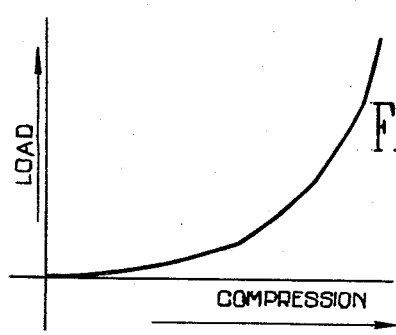
Figure 9 is the stress-strain curve of the construction of Figure 8.

The stress-strain curve may further be modified by the application of plates, such as 11, vulcanised or otherwise secured to part of the surface of the block as shown in Figure 8 producing a stress-strain curve as shown in Figure 9.

A simple form of construction is shown in Figure 10 in which additional plates are united by surface bonding to the sides of the rubber block, and the fastening plates have heads 13 lying within a shaped piece, such as 14, which progressively restricts the distortion of the block when subject to tension stress.

Instead of using a single block as shown in Figures 1 to 9, a plurality of blocks may be used disposed in series as shown in Figure 11, in which a number of blocks are threaded upon a common spindle 15, these blocks being either of similar or differing size. All, or only some of the blocks, may be associated with distortion controlling abutments, such as the plates 16, 17; that is to say, a plate 17 may be arranged between each adjacent pairs of blocks or only between one or more pairs as shown in Figure 11.

Further, these plates may have differing curvatures, although the blocks are similar in contour, so that the stress-strain curves for the individual blocks are not similar. As shown in the arrangements of Figures 13 and 14, it will be noticed that the intermediate plates 18, 19, 20, 21 are of differing contour.

Figure 15:
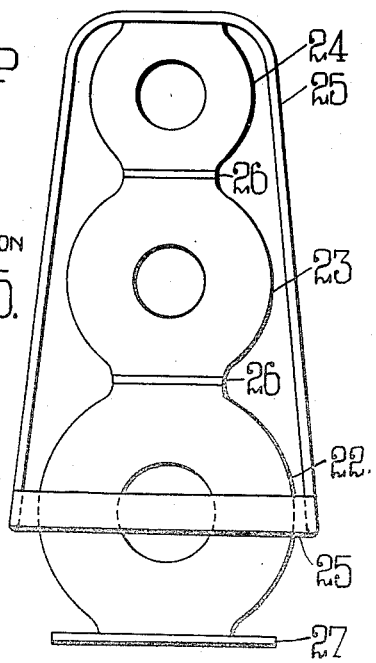
Figure 15 shows a modification of the construction shown in Figure 11.
Figure 16:
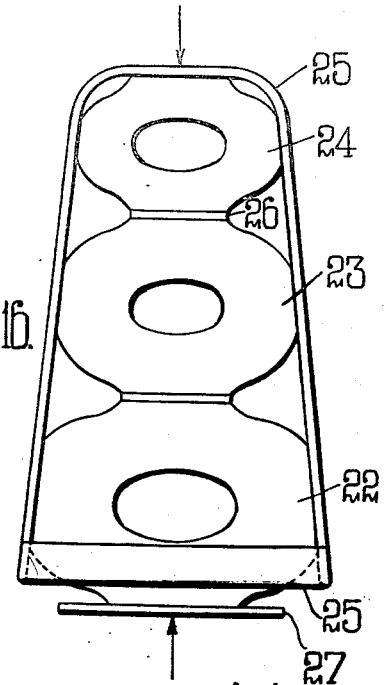
Figure 16 shows the same construction under a compression load.

Figures 15 and 16 show an arrangement in which blocks of progressive sizes 22, 23, 24, are used disposed in series and cooperating with an abutment surface in the form of a simple hoop 25. The blocks are vulcanised to intermediate plates 26 and to a plate 27.

Figure 16 shows the engagement of parts of the blocks 22, 23, 24 as these are subject to a compression applied in opposite directions, upon the plate 27 and the bow 25.

As shown in Figures 17 and 18 the arrangement is equally applicable to constructions in which blocks 28 are disposed in parallel between plates 29.

Figure 19 shows the application of the invention to a mechanical coupling or other arrangement for transmitting torque in which opposite pairs of abutments 31 are connected for example, to the driving element whilst opposite pairs 32 alternately disposed therewith are connected to the driven abutment, blocks 33 of any desired form being interposed therewith, together with distortion controlling plates 34.

The blocks may be flat-sided as shown in Figure 12 or may be of the cross-section shown in Figures 20 and 21; that is to say, truncated wedge shape in cross-section. Furthermore, distortion controlling plates may be provided on the side surfaces of the block as well as on its end surfaces.

I declare that what I claim is:

1. A shock absorbing device comprising a plurality of rubber blocks arranged in superposed relation, a rigid plate disposed between the adjacent sides of each pair of blocks and surface bonded thereto, each of said blocks being perforated so as to leave a free open space intermediate the plates on each block, and a bowed member fastened to the block at one end of the assembly and having projecting side portions adapted to contact with progressively increasing areas of the blocks with increase of stress thereon.

2. A shock absorbing device comprising a plurality of rubber blocks arranged in superposed relation, rigid plates bonded to opposite sides of each of said blocks and having portions projecting beyond the edges of such sides and adapted to contact with peripherally progressively increasing areas of each block respectively with increase of stress on said blocks, the blocks and plates being so constructed and arranged that with the blocks under stress, the areas of such contact on the blocks are respectively different.

3. A shock absorbing device comprising a plurality of rubber blocks arranged in superposed relation and means to progressively restrict the free deflection of different areas of said blocks with increase of stress on the blocks, the blocks and said means being so related to each other that with the blocks under stress, the restricted areas on the blocks are respectively different.

NATHAN SOLLY STERN.